US008438628B2

(12) United States Patent
Shah et al.

(10) Patent No.: US 8,438,628 B2
(45) Date of Patent: May 7, 2013

(54) METHOD AND APPARATUS FOR SPLIT-TERMINATING A SECURE NETWORK CONNECTION, WITH CLIENT AUTHENTICATION

(75) Inventors: Paras Shah, Sunnyvale, CA (US); Case Thomas Larsen, Union City, CA (US); Shashidhar Merugu, Mountain View, CA (US); Yongsub Nam, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 112 days.

(21) Appl. No.: 12/826,430

(22) Filed: Jun. 29, 2010

(65) Prior Publication Data
US 2010/0299525 A1    Nov. 25, 2010

Related U.S. Application Data

(63) Continuation-in-part of application No. 11/489,414, filed on Jul. 18, 2006.

(60) Provisional application No. 60/707,804, filed on Aug. 10, 2005.

(51) Int. Cl.
*G06F 21/00* (2006.01)
(52) U.S. Cl.
USPC .............. 726/12; 726/15; 713/153; 713/156; 713/171; 380/44; 380/255; 380/277; 455/410; 705/59; 709/218
(58) Field of Classification Search .................. 713/153, 713/156; 726/12
See application file for complete search history.

(56) References Cited

U.S. PATENT DOCUMENTS 6,094,485 A    7/2000  Weinstein et al.
6,104,716 A *  8/2000  Crichton et al. .............. 370/401
(Continued)

FOREIGN PATENT DOCUMENTS

EP    1533982 A2    5/2005
WO    0103398 A2    1/2001
(Continued)

OTHER PUBLICATIONS

Zhu et al., "Splendor: A secure, private, and location-aware service discovery protocol supporting mobile services", Pervasive Computing and Communications, 2003. (PerCom 2003). Proceedings of the First IEEE International Conference on, Date of Conference: Mar. 23-26, 2003, pp. 235-242.*

(Continued)

*Primary Examiner* — Morshed Mehedi
(74) *Attorney, Agent, or Firm* — Park, Vaughan, Fleming & Dowler, LLP (57) ABSTRACT

A method and apparatus are provided for split-terminating a secure client-server communication connection, with client authentication. During handshaking between the client and the server, cooperating network intermediaries relay the handshaking messages, without altering the messages. At least one of the intermediaries possesses a private key of the server, and extracts a set of data fields from the handshaking messages, including a Client-Key-Exchange message that can be decrypted with the private key. The intermediary uses the extracted data to compute the client-server session key separate from the client's and the server's similar computation, and may transmit the key to the other intermediary via a secure communication channel. The client and the server thus establish the end-to-end client-server connection, and may authenticate each other, after which the network intermediaries may intercept and optimize the client-server communications transparently to the client and the server.

20 Claims, 5 Drawing Sheets

U.S. PATENT DOCUMENTS

| | | | |
|---|---|---|---|
| 6,105,067 A | 8/2000 | Batra | |
| 6,526,131 B1 | 2/2003 | Zimmerman et al. | |
| 6,584,567 B1 | 6/2003 | Bellwood et al. | |
| 6,643,701 B1 | 11/2003 | Aziz et al. | |
| 6,658,114 B1 | 12/2003 | Farn et al. | |
| 6,681,327 B1 | 1/2004 | Jardin | |
| 6,704,798 B1 | 3/2004 | Mogul | |
| 6,728,884 B1 | 4/2004 | Lim | |
| 6,799,270 B1 | 9/2004 | Bull et al. | |
| 6,918,041 B1 | 7/2005 | Chen | |
| 6,996,841 B2 | 2/2006 | Kadyk et al. | |
| 7,007,163 B2 | 2/2006 | Tardo et al. | |
| 7,010,608 B2 | 3/2006 | Garg et al. | |
| 7,073,066 B1 | 7/2006 | Nessett | |
| 7,082,535 B1 * | 7/2006 | Norman et al. | 713/163 |
| 7,120,666 B2 | 10/2006 | McCanne et al. | |
| 7,146,505 B1 | 12/2006 | Harada et al. | |
| 7,174,565 B2 | 2/2007 | Kadyk et al. | |
| 7,219,120 B2 | 5/2007 | Hui | |
| 7,240,366 B2 | 7/2007 | Buch et al. | |
| 7,343,398 B1 | 3/2008 | Lownsbrough | |
| 7,370,351 B1 * | 5/2008 | Ramachandran et al. | 726/8 |
| 7,401,159 B1 | 7/2008 | Aviani et al. | |
| 7,421,735 B2 | 9/2008 | Kerstens et al. | |
| 7,502,726 B2 | 3/2009 | Panasyuk et al. | |
| 7,506,369 B2 | 3/2009 | Buch et al. | |
| 7,543,146 B1 | 6/2009 | Karandikar et al. | |
| 7,568,114 B1 | 7/2009 | Schlafly | |
| 7,647,404 B2 | 1/2010 | Cooper et al. | |
| 7,661,131 B1 * | 2/2010 | Shaw et al. | 726/15 |
| 7,770,007 B2 | 8/2010 | Bobde et al. | |
| 7,827,405 B2 | 11/2010 | Christiansen et al. | |
| 7,853,699 B2 | 12/2010 | Wu et al. | |
| 7,865,720 B2 | 1/2011 | Little et al. | |
| 7,895,446 B2 | 2/2011 | Harada et al. | |
| 7,904,949 B2 | 3/2011 | Bowers et al. | |
| 7,958,347 B1 | 6/2011 | Ferguson | |
| 7,979,555 B2 | 7/2011 | Rothstein et al. | |
| 7,984,160 B2 | 7/2011 | Lam | |
| 7,996,886 B1 | 8/2011 | Hughes et al. | |
| 8,020,201 B2 | 9/2011 | Adusumilli et al. | |
| 8,176,186 B2 | 5/2012 | McCanne et al. | |
| 8,266,452 B2 * | 9/2012 | Dunn et al. | 713/193 |
| 2001/0047474 A1 | 11/2001 | Takagi et al. | |
| 2002/0016911 A1 | 2/2002 | Chawla et al. | |
| 2002/0023145 A1 | 2/2002 | Orr et al. | |
| 2002/0035681 A1 | 3/2002 | Maturana et al. | |
| 2002/0069241 A1 | 6/2002 | Narlikar et al. | |
| 2002/0157019 A1 | 10/2002 | Kadyk et al. | |
| 2002/0163884 A1 | 11/2002 | Peles et al. | |
| 2002/0165928 A1 | 11/2002 | Landfeldt et al. | |
| 2003/0005280 A1 | 1/2003 | Bobde et al. | |
| 2003/0014628 A1 | 1/2003 | Freed et al. | |
| 2003/0014650 A1 | 1/2003 | Freed et al. | |
| 2003/0105810 A1 | 6/2003 | McCrory et al. | |
| 2003/0196084 A1 * | 10/2003 | Okereke et al. | 713/156 |
| 2003/0200332 A1 | 10/2003 | Gupta et al. | |
| 2003/0233539 A1 * | 12/2003 | Tardo et al. | 713/153 |
| 2004/0010596 A1 | 1/2004 | Hui | |
| 2004/0015725 A1 | 1/2004 | Boneh et al. | |
| 2004/0088542 A1 | 5/2004 | Daude et al. | |
| 2004/0243703 A1 | 12/2004 | Demmer et al. | |
| 2005/0001660 A1 | 1/2005 | Roy | |
| 2005/0008158 A1 * | 1/2005 | Huh et al. | 380/256 |
| 2005/0021956 A1 | 1/2005 | Genty et al. | |
| 2005/0050316 A1 | 3/2005 | Peles | |
| 2005/0060426 A1 | 3/2005 | Samuels et al. | |
| 2005/0065799 A1 | 3/2005 | Dare et al. | |
| 2005/0081029 A1 | 4/2005 | Thornton et al. | |
| 2005/0108517 A1 | 5/2005 | Dillon et al. | |
| 2005/0138353 A1 * | 6/2005 | Spies et al. | 713/153 |
| 2005/0138359 A1 | 6/2005 | Simon et al. | |
| 2005/0144463 A1 | 6/2005 | Rossebo et al. | |
| 2005/0240777 A1 | 10/2005 | Keohane et al. | |
| 2005/0265327 A1 | 12/2005 | Buch et al. | |
| 2006/0069719 A1 | 3/2006 | McCanne et al. | |
| 2006/0143702 A1 | 6/2006 | Hisada et al. | |
| 2006/0168210 A1 * | 7/2006 | Ahonen et al. | 709/225 |
| 2006/0174106 A1 | 8/2006 | Bell et al. | |
| 2006/0190612 A1 * | 8/2006 | Kahol et al. | 709/230 |
| 2006/0209789 A1 * | 9/2006 | Gupta et al. | 370/352 |
| 2007/0038853 A1 | 2/2007 | Day et al. | |
| 2007/0058807 A1 * | 3/2007 | Marsh | 380/44 |
| 2007/0074282 A1 | 3/2007 | Black et al. | |
| 2007/0199061 A1 | 8/2007 | Byres et al. | |
| 2008/0046714 A1 | 2/2008 | Suganthi et al. | |
| 2008/0060055 A1 | 3/2008 | Lau | |
| 2008/0077982 A1 | 3/2008 | Hayler et al. | |
| 2008/0115200 A1 | 5/2008 | Olson et al. | |
| 2008/0126794 A1 | 5/2008 | Wang et al. | |
| 2008/0126801 A1 | 5/2008 | Lee et al. | |
| 2008/0263215 A1 | 10/2008 | Schnellbaecher | |
| 2008/0307219 A1 | 12/2008 | Karandikar | |
| 2009/0013399 A1 * | 1/2009 | Cottrell et al. | 726/12 |
| 2009/0083537 A1 | 3/2009 | Larsen et al. | |
| 2009/0083538 A1 | 3/2009 | Merugu et al. | |
| 2009/0089862 A1 | 4/2009 | Sun | |
| 2009/0113537 A1 | 4/2009 | Woo | |
| 2009/0119504 A1 | 5/2009 | Van Os et al. | |
| 2009/0220080 A1 * | 9/2009 | Herne et al. | 380/255 |
| 2010/0031337 A1 | 2/2010 | Black et al. | |
| 2010/0049970 A1 | 2/2010 | Fraleigh et al. | |
| 2010/0071048 A1 | 3/2010 | Novak et al. | |

FOREIGN PATENT DOCUMENTS

| | | |
|---|---|---|
| WO | 0137068 A2 | 5/2001 |
| WO | 2005060202 A1 | 6/2005 |

OTHER PUBLICATIONS

Dierks et al., "The Transport Layer Security (TLS) Protocol Version 1.2", Network Working Group Request for Comments: 5246 (Aug. 2008).

Larsen, Case Thomas et al., "Server Configuration Selection for SSL Interception", U.S. Appl. No. 11/489,414, US pub date: Feb. 15, 2007.

Tschalar, Ronald et al., "NTLM Authentication Scheme for HTTP", Jun. 17, 2003, http://www.innovation.ch/personal/ronald/ntlm.html, pp. 1-5, downloaded Jan. 20, 2009.

"Kerberos: The Network Authentication Protocol", http://web.mit.edu/Kerberos/, pp. 1-3, downloaded Jan. 20, 2009.

"Microsoft NTLM", http://msdn.microsoft.com/en-us/library/aa378749.aspx, pp. 1-2, downloaded Jan. 20, 2009.

"NTLM", http://en.wikipedia.org/wiki/NTLM, pp. 1-5, downloaded Jan. 20, 2009.

"Kerberos (protocol)", http://en.wikipedia.org/wiki/Kerberos_(protocol), pp. 1-5, downloaded Jan. 20, 2009.

"The Industry Insiders", http://blogs.technet.com/industry_insiders/articles/407751.aspx, downloaded Jan. 20, 2009.

Christensen, Jesper M, "Kerberos in a Sharepoint Environment", Jul. 30, 2008, http://www.windowsecurity.com/articles/Kerberos-Sharepoint-Environment.html, pp. 1-13, downloaded Jan. 20, 2009.

"The NTLM Authentication Protocol and Security Support Provider", http://davenport.sourceforge.net/ntlm.html, pp. 1-93, downloaded Jan. 21, 2009.

"Integrated Windows Authentication (IIS 6.0)", http://microsoft.com/technet/prodtechnol/WindowsServer2003/Library/IIS/523ae943-5e6a-4200-9103-9808baa00157.mspx?mfr=true, pp. 1-2, downloaded Jan. 21, 2009.

* cited by examiner

FIG. 1

FIG. 2    Handshaking Process 200

FIG. 3  Handshaking Process 300

METHOD AND APPARATUS FOR SPLIT-TERMINATING A SECURE NETWORK CONNECTION, WITH CLIENT AUTHENTICATION

RELATED APPLICATION

This application is a continuation-in-part of co-pending U.S. patent application Ser. No. 11/489,414, entitled "Split Termination for Secure Communication Protocols," which was filed Jul. 18, 2006 and which is hereby incorporated by reference for all purposes. U.S. patent application Ser. No. 11/489,414 claims priority to U.S. Provisional Patent Application No. 60/707,804, filed Aug. 10, 2005, which is also hereby incorporated by reference for all purposes.

FIELD

The present invention relates to optimization of network communications, and in particular to a system and method for establishing a secure split-terminated client-server communication connection while supporting authentication of the client, by the server, and enabling a network intermediary to optimize subsequent client-server communications.

BACKGROUND

To secure communications dispatched across networks and other communication links, especially un-trusted links, various public-key and/or symmetric-key cryptographic techniques are often put to use. Typically, public-key cryptography has better security properties but is more expensive computationally than symmetric-key cryptography. Therefore, the two types of cryptography may be combined, so as to use a public-key technique to negotiate a symmetric cipher between two entities. The symmetric-key cipher may then be used for bulk data transfer between the entities.

Transport Layer Security (TLS) and its predecessor, Secure Socket Layer (SSL), are widely-used examples of secure communication protocols that have this form, as well as IPSec (Internet Protocol Security) when security associations are negotiated using RSA-based (Rivest, Shamir & Adleman) mechanisms for IKE (Internet (or IPsec) Key Exchange).

A transaction accelerator such as that described in U.S. Pat. No. 7,120,666 (McCanne) can offer performance improvement for operations across a wide-area network (WAN), but only when the data being communicated is either intelligible (i.e., the transaction accelerator can interpret at least parts of the protocol) or repeating (i.e., identical data crosses the network in identical format). The use of secure communication protocols such as SSL and TLS thus typically frustrates transaction acceleration, because cryptography (by design) renders encrypted data unintelligible and non-repeating.

A method of using a cooperating pair of transaction accelerators to optimize secure end-to-end communications between a client and a server is described in U.S. Patent Publication No. US2007/0038853 (application Ser. No. 11/489,414), and involves the use of separate, split-terminated, secure protocol sessions between one transaction accelerator and the client, and between the cooperating transaction accelerator and the server.

However, transaction accelerators generally are not equipped to participate in all authentication schemes between a client and a server. In particular, traditional schemes for optimizing or accelerating network transactions may be unable to optimize a connection in which a server must authenticate a client using a digital certificate.

Previous attempts to enable transaction acceleration for a client-server connection established using a secure communication protocol that enforces client authentication have generally either ignored (i.e., not performed) authentication of the client, or allowed a transaction accelerator (or other entity) to employ a substitute certificate in place of a client's true digital certificate to terminate the client's end of the connection.

Typically, solutions of the latter type apply a single substitute certificate for all clients, or apply one of a small number of substitute certificates, wherein each substitute certificate was used for a different class or subset of clients. As a result, authentication that requires a unique client attribute would fail under these schemes, or, even if authentication succeeded, a server may be unable to distinguish between multiple clients.

SUMMARY

In some embodiments of the invention, a method and apparatus are provided for establishing a secure client-server communication connection, with client authentication, wherein the connection is split-terminated at a pair of intermediate network devices that can cooperate to optimize client-server communications. The communication connection may be established using SSL (Secure Sockets Layer), TLS (Transport Layer Security) or some other secure communication protocol that provides for client authentication.

The intermediaries include a server-side intermediary for interacting with a server, and a client-side intermediary for interacting with a client. The client-side intermediary may be installed on the client or may comprise a separate entity. Either or both intermediaries may be configured to act as Certificate Authorities (CAs), or with a CA certificate that allows it to authenticate another entity's digital certificate.

In some embodiments of the invention, either or both network intermediaries observe handshaking messages exchanged by the client and the server as the communication connection is established. The intermediaries need not alter the handshaking messages, but may extract and store some data fields.

Also, at least one of the intermediaries possesses a private cryptographic key of the server, which corresponds to a digital certificate that the server provides the client in order to permit authentication of the server. With this key, the intermediary is able to access protected data within the handshaking messages (e.g., a pre-Master-Secret of a Client-Key-Exchange message).

Using the captured data, an intermediary is able to compute the same session key separately computed by the client and the server. One intermediary may compute this key and share it with the other.

Thereafter, an intermediary is able to receive a client request (or server response to a client request), decrypt it with the session key, optimize it and forward it to the cooperating intermediary, where it is reconstituted, re-encrypted with the session key and delivered to its destination.

In these embodiments of the invention, the client and/or the server may authenticate each other, fully transparently, and yet the pair of network intermediaries are able to participate in the resulting client-server connection to accelerate (or otherwise improve) transactions.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, a method and apparatus are provided for enabling split-termination and optimization of a secure client-server network connection, while enabling required authentication of the client with a digital certificate. The end-to-end connection may be secured via TLS (Transport Layer Security), SSL (Secure Sockets Layer) or another suitable protocol for securing data communications that allows for client authentication. The server may also be authenticated.

In these embodiments, one or more intermediate entities (e.g., a cooperating pair of transaction accelerators) are positioned within a communication path between the client and the server. During the handshaking process, these entities passively observe the exchange of messages, and may capture some data without impeding or altering the process. After the connection is established, however, they are able to participate in the connection.

Figure 1:
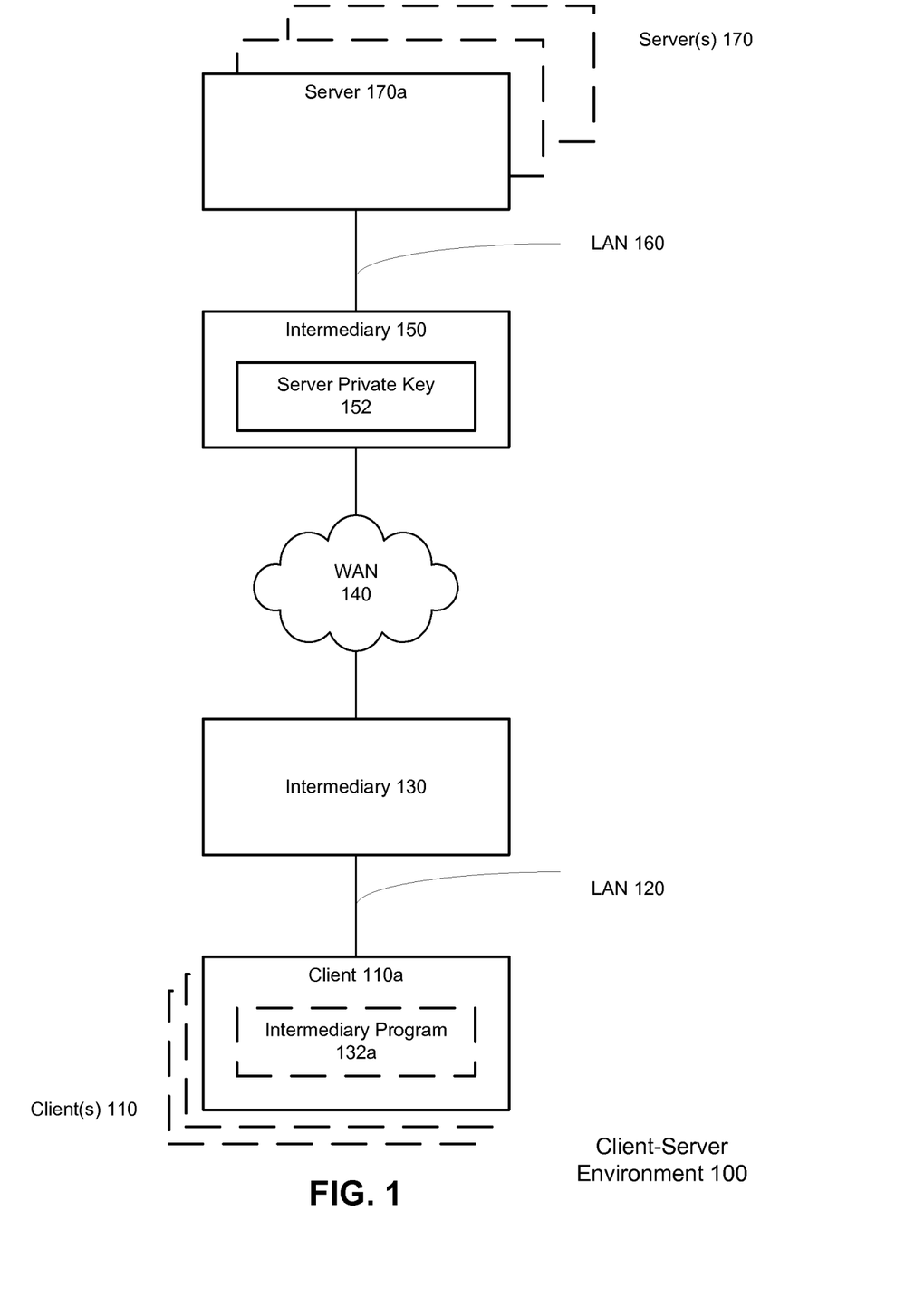
FIG. 1 is a block diagram depicting a computing environment in which one or more network intermediaries enable split-termination of a secure client-server network connection, with authentication of the client, according to some embodiments of the invention.

FIG. 1 illustrates an environment in which some embodiments of the invention may be implemented. In this environment, clients 110 (e.g., client 110a) communicate with servers 170 (e.g., server 170a) in client-server relationships established via TLS, SSL or some other secure protocol. Intermediaries 130, 150 are situated in a path of communication between client 110a and server 170a.

Intermediaries 130, 150 are coupled via WAN (Wide Area Network) 140, while client 110a is coupled to intermediary 130 via LAN (Local Area Network) 120 and server 170a is coupled to intermediary 150 via LAN 160. Thus, intermediary 130 is relatively local to client 110a, while intermediary 150 is relatively local to server 170a (e.g., within the same data center).

In the embodiment of FIG. 1, communications traversing WAN 140 are characterized by relatively high latency and low bandwidth in comparison to communications transiting LANs 120, 160. In other embodiments of the invention, other types of wired and/or wireless communication links may be employed. For example, LAN 120 and/or LAN 160 may be WANs, a LAN may be a point-to-point link or a WAN, etc.

Intermediary 130 may be termed a "client-side intermediary" (or CSI) and intermediary 150 may be termed a "server-side intermediary" (or SSI) to reflect their relative positions within environment 100. Although not shown in FIG. 1, additional client side intermediaries may also cooperate with server-side intermediary 150, and/or client-side intermediary 130 may cooperate with other server-side intermediaries.

In some implementations, a client-side intermediary may be installed on a client 110a, as intermediary program 132a, particularly if the client is a portable computing device. In these implementations, CSI 130 may be omitted, bypassed or may operate in a pass-through mode for communications issued from and to client 110a. Reference to a client-side intermediary herein should be interpreted so as to encompass intermediary 130 and/or intermediary program 132a, as appropriate.

In one particular embodiment of the invention, intermediaries 130, 150 are Steelhead™ transaction accelerators from Riverbed® Technology, and are configured to optimize communications and applications (e.g., through compression or acceleration). Transaction accelerators are referred to in the art by many different terms, including, but not limited to, wide area network (WAN) accelerators, WAN optimizers, WAN optimization controllers (WOCs), wide-area data services (WDS) appliances, WAN traffic optimizers (WTOs), and protocol accelerators or optimizers. In other embodiments, the intermediaries may be configured to perform other operations in addition to or instead of optimization, such as routing, caching, etc.

All communication traffic between client 110a and server 170a may traverse intermediaries 130, 150 (or intermediary program 132a and intermediary 150) in the illustrated embodiment of the invention. One or both intermediaries may also handle traffic between client 110a and entities other than server 170a, and/or traffic between server 170a and other entities. In other embodiments, the client and server may also utilize other communication paths that avoid one or both of the intermediaries.

In the embodiment of the invention described in FIG. 1, one or more of client 110a, intermediaries 130, 150 and server 170a are configured with CA (Certificate Authority) digital certificates, which are trusted by the entities and which allow them to verify a digital certificate received from another entity.

Server-side intermediary 150 possesses a copy of a private key of server 170a that corresponds to a digital certificate that the server uses to authenticate itself to client 110a, and that is issued by a CA trusted by the client. In an alternative embodiment of the invention, the SSI may possess a proxy certificate similar to the server's certificate, wherein one or more attributes of the proxy server certificate (e.g., name/subject) are identical to the original certificate held by server 170a.

U.S. patent application Ser. No. 11/489,414, entitled "Split Termination for Secure Communication Protocols", describes a method for establishing split-terminated communication connections between clients (e.g., clients 110) and servers (e.g., servers 170) that are secured using SSL, TLS or some other appropriate secure communication protocol.

One method of forming a split-terminated secure communication session between two endpoints (e.g., client 110a and server 170*a*) involves establishing multiple secure communication sessions involving the two endpoints and one or more intermediaries. Specifically, a client session may be established between the client and one intermediary, and a server session may be established between the server and the same or a different intermediary.

In embodiments of the invention described herein, a secure client-server communication connection is established between a client and a server, with one or more intermediaries observing the connection process. The intermediaries receive and forward handshaking messages exchanged by the client and the server, without altering the messages, and may read (and store) various fields of the messages.

The intermediary (or intermediaries) that have an appropriate private key of the server (i.e., the private key corresponding to the digital certificate proffered by the server to the client) can read and decrypt a Client-Key-Exchange message issued by the client during the client-server handshaking. Doing so allows one or both intermediaries to compute the same session key computed separately by the client and the server. Thereafter, the intermediaries may intercept communications between the client and server, optimize them, and forward them.

Thus, in some embodiments of the invention, split-termination of a secure client-server communication connection is performed after the client and the server have established their connection. Passive observation of the establishment of this connection allows the intermediary (or intermediaries) to obtain the data needed to compute the session key without interfering with client or server activity to verify the other entity. The intermediary's (or intermediaries') involvement in the client-server connection, to optimize the client-server communications, is thus transparent to both endpoints.

Therefore, no special application, utility or plug-in need be installed on clients 110 or servers 170 in order for them to participate in a secure split-terminated client-server communication connection described herein.

Figure 2:
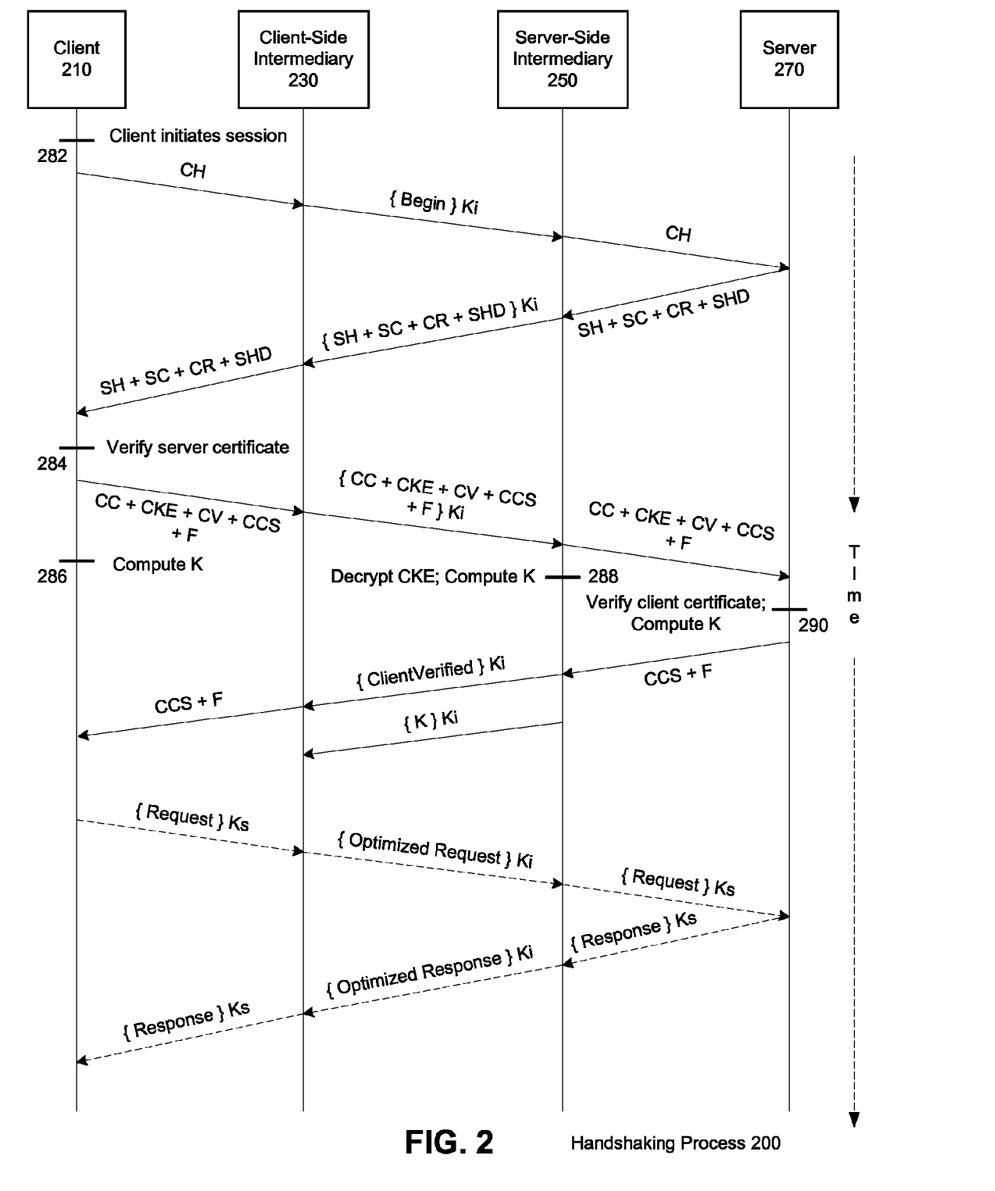
FIG. 2 is a time sequence diagram demonstrating a handshaking process for establishing a split-terminated secure communication connection between a client and a server, with certificate-based authentication of the client, according to some embodiments of the invention.

FIG. 2 is a time sequence diagram demonstrating a method of split-terminating a secure end-to-end client-server communication connection in which a client is authenticated using a digital certificate, according to some embodiments of the invention.

In one such embodiment, server 270 communicates with server-side intermediary (SSI) 250 directly or via a LAN, SSI 250 communicates with client-side intermediary (CSI) 230 via a WAN, and CSI 230 communicates with client 210 via a LAN or other communication link. The directed vectors between these entities represent messages involved in handshaking process 200.

Prior to handshaking process 200, server 270, client 210 and one or more of CSI 230 and SSI 250 receive Certificate Authority certificates with which they can authenticate a digital certificate proffered by the client and/or the server. For example, an organization that has deployed client 210 and server 270 may maintain a CA for issuing certificates to be used within the operating environment. That CA's certificate may be copied to any or all of the entities depicted in FIG. 2.

In addition, server-side intermediary 250 receives a copy of a private key of server 270, which corresponds to a digital certificate used by the server to authenticate itself to a client such as client 210. The SSI may receive multiple private keys if the server uses multiple certificates. These keys may be received via a regular, secure, network communication, or may be received off-line (e.g., entered by a system administrator) through an export process or other procedure.

In some embodiments of the invention, instead of receiving the server's private key, the server-side intermediary may instead be granted access to a key vault or other secure repository through which the SSI may have the server's key applied as described below.

In the illustrated embodiment of the invention, at time sequence 282, the client initiates a secure communication connection with the server. For purposes of clarity, data exchanges between protocol layers up through the transport protocol layer (e.g., TCP) are omitted so that the discussion can be focused on the SSL/TLS handshaking process.

After time sequence 282, or possibly in advance of time sequence 282, CSI 230 and SSI 250 establish a secure channel or tunnel between them, so as to protect communications exchanged across the WAN or other link that connects the intermediaries. In one implementation, the intermediaries employ TLS or SSL to establish a symmetric key, although in other implementations they may employ a different security scheme. A cryptographic key used by the intermediaries to encrypt/decrypt messages sent via the tunnel is represented herein as Ki. The tunnel may be used for intermediary communications for any number of client-server connections at any given time.

When the client initiates the secure connection, it issues a Client-Hello (CH) message toward the entity with which it wishes to communicate—server 270. The Client-Hello message comprises a client seed (e.g., a 16 or 32 byte random number) that will be used during generation of a session key, and may also include other information, such as protocols/versions it supports, encryption and/or compression schemes it can employ, etc. The absence of curly braces "{" and "}" around the Client-Hello message indicates that the message is sent as clear text.

Upon receipt or interception of the Client-Hello message, CSI 230 notifies SSI 250 of the requested connection. This notification message is depicted as "{Begin} Ki" in FIG. 2, although it may simply comprise the Client-Hello message originated by client 210. The use of curly braces and "Ki" indicates that this message may be encrypted with the intermediaries' shared key Ki. SSI 250 therefore decrypts the Begin message (with Ki) and extracts any necessary information, such as the client seed. In some alternative embodiments of the invention, the CSI may simply forward the client's Client-Hello message in clear text.

Upon notification of the client connection request, SSI 250 may simply forward to the server the Client-Hello message originated by the client. Alternatively, the server-side intermediary may issue a new Client-Hello message formatted so as to appear to come directly from the client (e.g., using information contained in the original Client-Hello message and/or received from the client-side intermediary).

The server responds with several messages/records, including a Server-Hello (SH) message, a Certificate message that includes a digital certificate (SC) issued to the server, a Certificate-Request (CR) message requesting the client's digital certificate, and a Server-Hello-Done (SHD) message. As described above, the server-side intermediary has received or will receive a copy of the private key corresponding to certificate SC.

The SH message also includes a server seed (e.g., another random number), and may include other information, such as the elected options for protocol/version/encryption/compression, etc. The SSI may verify server certificate SC to ensure it is actually communicating with the server, and not with an imposter.

SSI 250 now communicates with CSI 230 to forward the Server-Hello, Certificate, Certificate-Request and Server- Hello-Done messages issued by server 270. As illustrated in FIG. 2, the messages to the client-side intermediary may be encrypted using key Ki.

CSI 230 receives and decrypts the communication from SSI 250, and forwards to client 210 the server's response to the client's Client-Hello message. In the illustrated embodiment of the invention, neither the client-side intermediary nor the server-side intermediary alters content of a handshaking message forwarded to or from the client or server.

At time sequence 284, the client verifies the server's digital certificate (SC).

Assuming the client successfully verifies the server's identity, it continues with the operative communication protocol handshaking by composing and issuing a Certificate message comprising a copy of a digital certificate (CC) issued to the client by a suitable Certificate Authority. The client also issues a Client-Key-Exchange (CKE) message, a Certificate-Verify (CV) message, a Change-Cipher-Specification (CCS) message and a Finish (F) message.

Illustratively, certificate CC may have been issued by a CA that is internal to an organization comprising both the client and the server, and may or may not have been issued by a CA whose public certificate is available on server-side intermediary 250 and the server. For example, the server-side intermediary may act as a CA and issue certificate CC. The CKE message comprises another secret (e.g., a Pre-Master-Secret) to be used in generating a session key, which is encrypted with the public key from server certificate SC.

The CV message comprises a signature over the handshaking messages that have been exchanged by client 210 and server 270 up to this point, signed with the private client key that corresponds to client certificate CC. Validation of the CV message can verify that the operator of client 210 possesses the correct key and is likely to be a valid user.

In some scenarios, client 210 may be able to perform certain cryptographic operations (including participating in the handshaking process of FIG. 2) while merely having control of or access to the private client key instead of actual possession. For example, the private key may be stored on a smartcard or similar device, and the client may be able to request the device to perform a particular operation (e.g., to sign the CV message).

The CCS message specifies that the communicants (client 210 and server 270) are to start encrypting their communications using a session key that is denoted herein as "K". The Finished message signals that the handshaking is complete from the client's point of view, and comprises an encrypted hash over the preceding handshaking messages.

Because all data needed to compute session key K (i.e., client and server seeds, pre-Master-Secret) are now known to the client, it may do so at time sequence 286.

CSI 230 receives and forwards the client's messages to SSI 250, preferably by encrypting them with the intermediaries' key Ki. SSI 250 forwards the client's messages to server 270.

At time sequence 288, the server-side intermediary may decrypt the CKE message and retrieve the pre-Master-Secret, using the private cryptographic key corresponding to certificate SC. And, it may also compute session key K using the necessary data gleaned from the handshaking messages. The SSI may or may not verify client certificate CC.

At time 290, server 270 verifies client certificate CC and computes session key K. Illustratively, the server decrypts CV with the public key of certificate CC and verifies that its contents are correct, and may check CC by referring to the issuing CA. If no errors are found, the server issues Change-Cipher-Specification (CCS) and Finish (F) messages toward client 210.

The server-side intermediary then informs the client-side intermediary that the server has authenticated the client and accepted the connection. As indicated in FIG. 2 this may comprise any suitable message to the CSI, or may simply involve forwarding the server's CCS+F messages (encrypted with Ki).

CSI 230 then delivers the server's final messages to client 210, and the client-server connection is established, with authentication of either or both endpoints (client, server) by the other endpoint.

Sometime after it computes key K, SSI 250 forwards the session key to CSI 230. This may occur at any time after the SSI computes the key at time sequence 288. In the illustrated embodiment of the invention, the client-server connection may therefore be deemed split-terminated as of time sequence 288, or some time thereafter, when one or both intermediaries are able to read and manipulate (e.g., to optimize) communications exchanged between the client and the server.

Client 210 and server 270 may now securely conduct transactions. In the illustrated embodiment of the invention, each client request is encrypted using K and submitted to CSI 230 by client 210. The CSI decrypts it using its copy of K.

The CSI may then optimize or otherwise manipulate the request, and encrypts it with Ki before transmitting it to SSI 250. At the server-side intermediary, the optimized message is decrypted with Ki, processed, re-encrypted with K and delivered to the server. The reverse process is then followed to securely deliver any server response to client 210.

In FIG. 2, the illustrated sequence of directed vectors does not necessarily indicate exact timing and/or sequencing of the corresponding actions and messages. For example, a message received by one entity may not be immediately forwarded, but rather may be processed or manipulated in some manner before the next message in sequence is issued. In addition, the various actions (e.g., verifying a certificate, computing a session key) need not occur in the exact order illustrated in FIG. 2.

The handshaking process of FIG. 2 satisfies an applicable security protocol (e.g., TLS, SSL), and explicitly supports authentication of the client by the server, even while allowing a pair of network intermediaries to split-terminate and participate in the secure client-server connection (e.g., to optimize transactions).

In some embodiments of the invention, one or both the client-side and server-side intermediaries may come on-line after a client and a server have performed a full handshaking process, but before they perform a reuse handshaking to resume a communication connection. In these embodiments, the intermediaries may enter a pass-through mode or other passive state to allow the client and the server to proceed without taking any action, because they do not have the necessary data (e.g., seeds, pre-Master-Secret) with which to compute the entities' session key. The next time a full handshaking is performed, process 200 may be employed.

In some other embodiments of the invention, however, when an intermediary detects the initiation of a reuse handshaking process, that intermediary may suppress the connection request and thereby attempt to cause the client and server to engage in a full handshaking process in order to establish a connection. When an intermediary monitors a full handshaking process, as described above in conjunction with FIG. 2 for example, the intermediary may store data that can be used to later re-calculate a session key in a reuse handshaking process.

Figure 3:
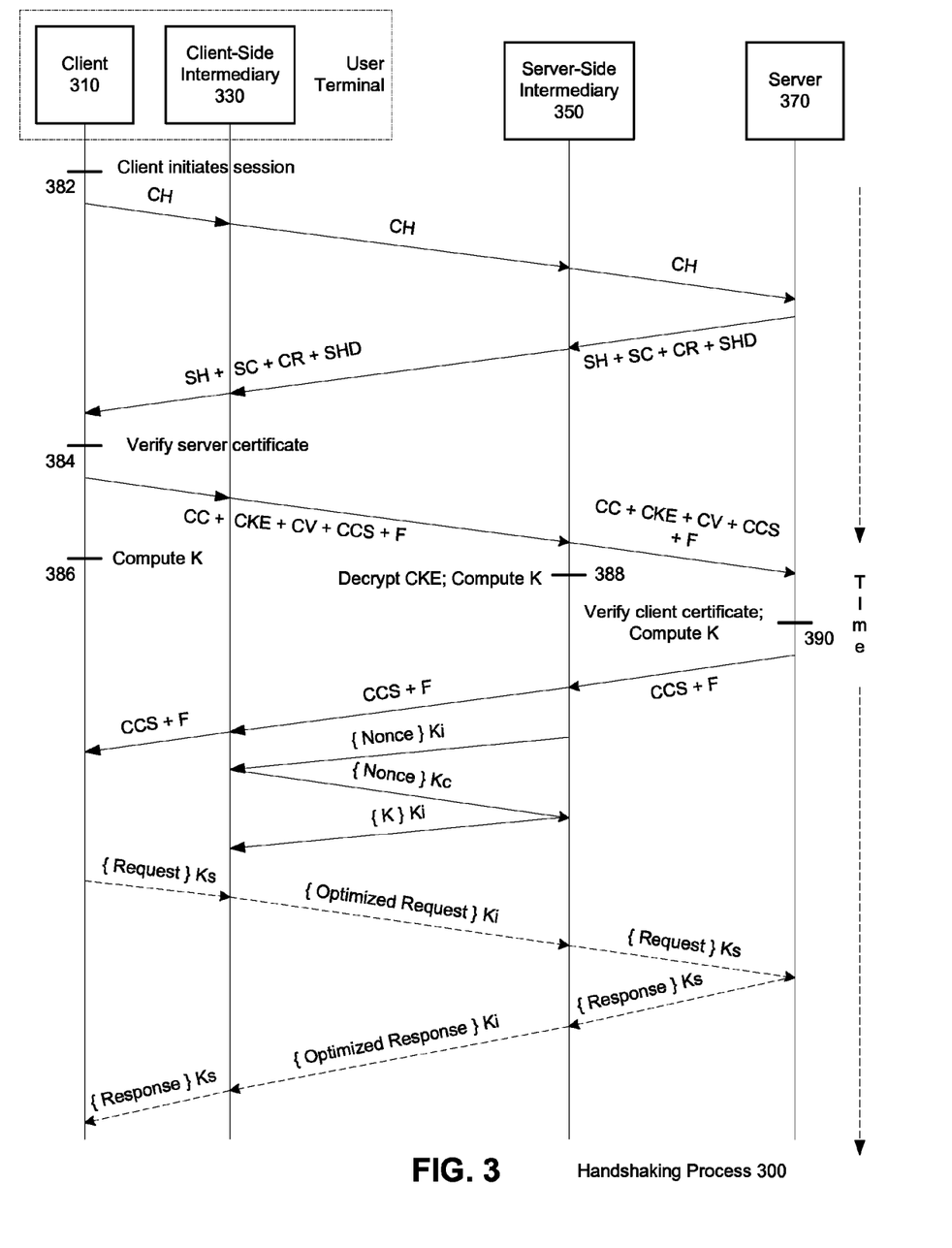
FIG. 3 is a time sequence diagram demonstrating another handshaking process for establishing a split-terminated secure communication connection between a client and a server, with certificate-based authentication of the client, according to some embodiments of the invention.

FIG. 3 is a time sequence diagram demonstrating another method of split-terminating a secure end-to-end client-server communication connection in which a client is authenticated using a digital certificate, according to some embodiments of the invention.

In these embodiments, a client-side intermediary is installed on a user terminal, which may be a laptop, notebook or other portable computing device. Thus, the CSI operates on the same platform as the client, which may comprise a browser or other user application. Co-locating the CSI with the client helps ensure that it will always be able to participate in (e.g., optimize) client-server communication connections initiated by the client, regardless of the location of the user terminal.

Handshaking process 300 of FIG. 3 is substantially similar to process 200 of FIG. 2 except for some precaution taken before supplying session key K to CSI 330 from SSI 350. In particular, prior to transmitting key K, the server-side intermediary transmits a cryptographic nonce—a random value used just once during the illustrated client-server connection.

CSI 330 must encrypt the nonce with the private cryptographic key (designated Kc herein) corresponding to client digital certificate CC, and return the encrypted value to the server-side intermediary. The SSI then verifies that the correct key was used by decrypting the message with the public key of certificate CC.

This precaution may be desired to ensure that the client that has initiated the secure client-server connection is, in fact, the client installed on the user terminal. This precaution is taken because it is possible for a connection request from a remote client (e.g., an application executing on a platform other than the user terminal) to be routed through the user terminal and CSI 330. In that case, the CSI would not have access to the remote client's private key and this security check would fail.

It may be noted that the private key of the client on the user terminal may be stored on a smart card or other device electrically coupled to the user terminal. This makes the key available to the client during the handshaking (e.g., to encrypt the Certificate-Verify message), and therefore also should make it available to CSI 330 to encrypt the nonce.

Although not shown in process 300 (in order to make the exchange of messages clearer), it should be noted that some, most or all communications exchanged between CSI 330 and SSI 350 may be encrypted with a shared intermediary key Ki, as described above. Thus, key Ki is not necessarily only used to secure the exchange of the nonce.

Figure 4:
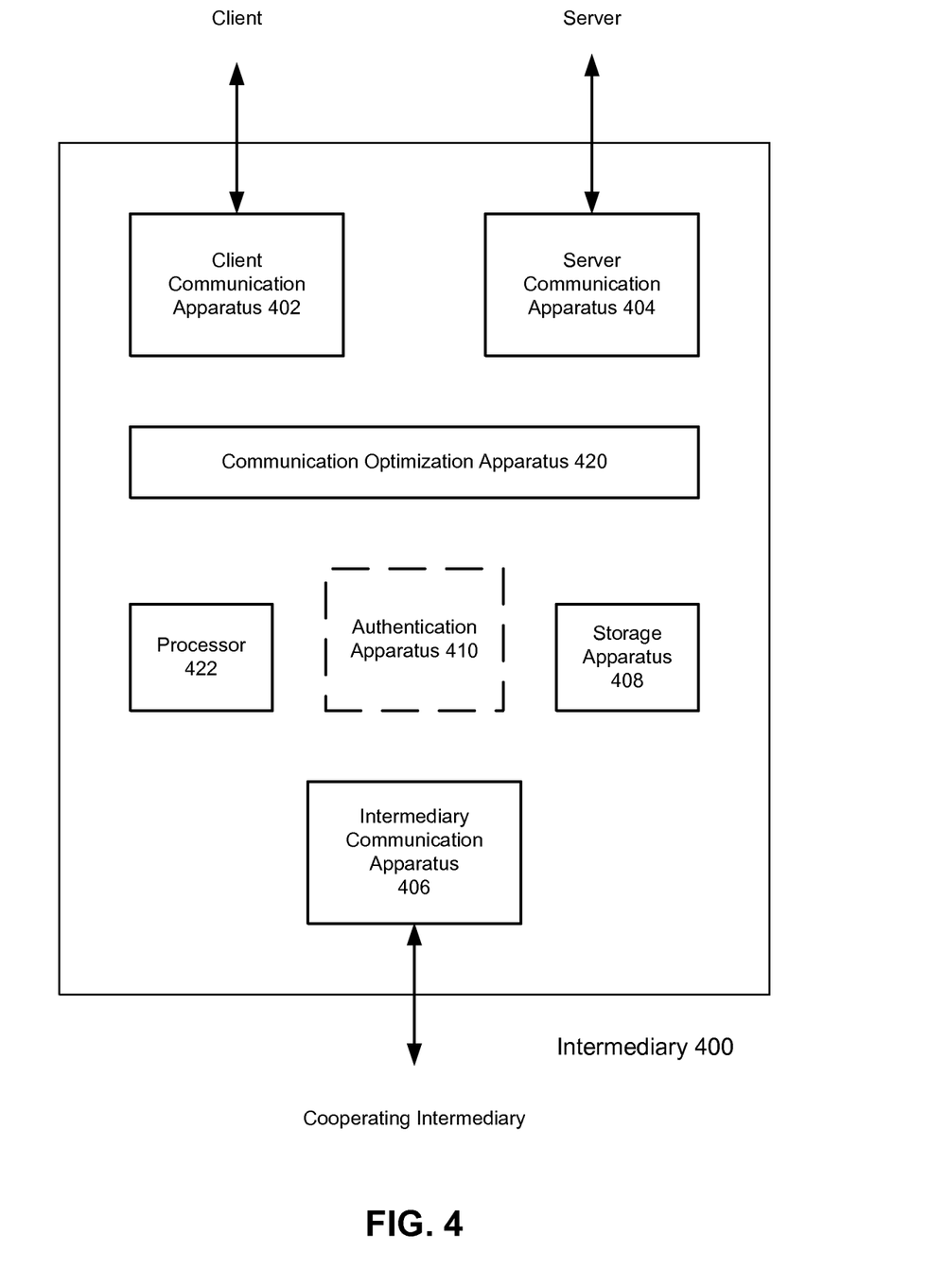
FIG. 4 is a block diagram of apparatus for facilitating a secure split-terminated client-server communication connection, with certificate-based authentication of the client, according to some embodiments of the invention.

FIG. 4 is a block diagram of hardware apparatus that may be employed to facilitate establishment of a secure split-terminated client-server communication connection with client authentication, according to some embodiments of the invention.

Intermediary 400 of FIG. 4 comprises communication apparatuses 402, 404, 406 for communicating with a client, a server and another intermediary, respectively. Depending on an intermediary's role (e.g., as a server-side or client-side intermediary), one or more of the communication apparatuses, and/or other components described below, may be omitted. Further, any or all of these communication apparatuses may be combined or divided in other embodiments of the invention.

The communication apparatuses are adapted to transmit communications to, and receive communications from, the indicated entities. The communication apparatuses may also be adapted to assemble/extract components of a communication, and/or to encrypt/decrypt a communication as needed.

Intermediary 400 also comprises storage apparatus 408 (e.g., a memory) for temporarily storing various information. Such information may include, but is not limited to, a proxy server digital certificate, copies of one or more private cryptographic keys of one or more servers, a CA's private key, other encryption/decryption keys, client seeds and/or server seeds observed during a handshaking process, etc.

Optional authentication apparatus 410 is adapted to authenticate a client, a server and/or another entity. Apparatus 410 may therefore be configured to verify a digital certificate, validate a Certificate-Verify message, and/or take other action. The authentication apparatus may communicate with an external entity to facilitate authentication of an entity or validation of a communication, and may therefore invoke one of communication apparatuses 402, 404, 406 or another communication apparatus not depicted in FIG. 4.

Communication optimization apparatus 420 is adapted to optimize communications exchanged with another intermediary. Thus, apparatus 420 may compress (or expand), encrypt (or decrypt), cache or otherwise enhance the efficiency of client-server communications.

Processor 422 is adapted to assist intermediary 400 in performing the various operations described in conjunction with FIG. 4. Thus, it may execute various algorithms stored as software and/or firmware.

Figure 5:
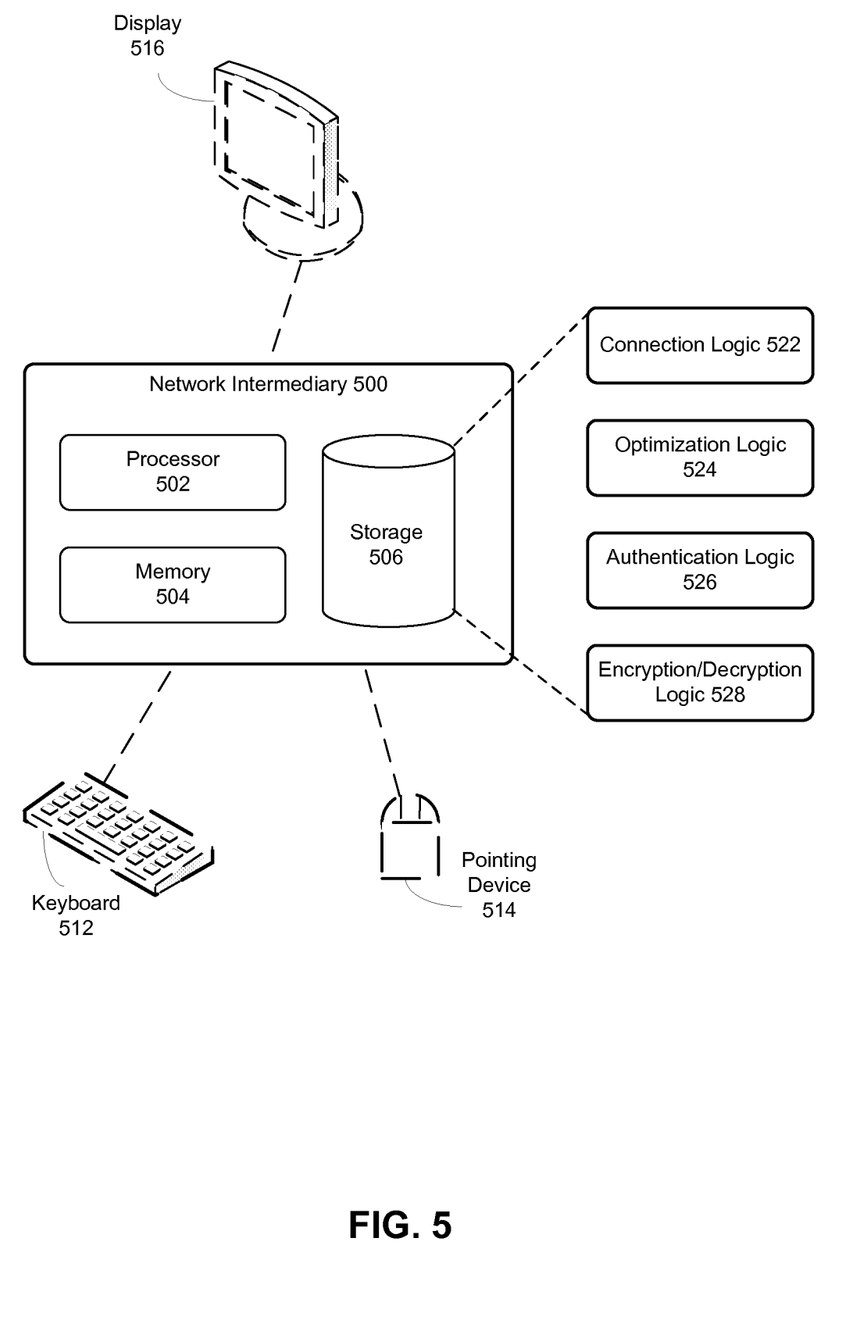
FIG. 5 is a block diagram of a network intermediary with which a secure split-terminated client-server communication connection may be established, with client authentication, according to some embodiments of the invention.

FIG. 5 is a block diagram of a network intermediary that may be employed to facilitate establishment of a secure split-terminated client-server connection with certificate-based authentication of a client, according to some embodiments of the invention.

Network intermediary 500 of FIG. 5 comprises processor 502, memory 504 and storage 506, which may comprise one or more optical and/or magnetic storage components. Network intermediary 500 may be coupled (permanently or transiently) to keyboard 512, pointing device 514 and display 516.

Storage 506 of the network intermediary stores logic that may be loaded into memory 504 for execution by processor 502. Such logic includes connection logic 522, optimization logic 524, authentication logic 526, and encryption/decryption logic 528.

Connection logic 522 comprises processor-executable instructions for establishing, maintaining and terminating communication sessions and connections. Such sessions may be with other network intermediaries, clients and/or servers.

Optimization logic 524 comprises processor-executable instructions for optimizing a communication. Such optimization may involve replacing all or a portion of the communication with substitute content for transmission to another network intermediary, exchanging substitute content in a communication received from another intermediary for its original content, compressing (or decompressing) content of a communication, etc.

Authentication logic 526 comprises processor-executable instructions for verifying a digital certificate, validating a Certificate-Verify message, and/or taking other action to authenticate a client (or other entity) or to validate a communication.

Encryption/decryption logic 528 comprises processor-executable instructions for encrypting/decrypting communications (or portions of communications) received at or prepared for transmission from intermediary 500.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of establishing a secure split-terminated communication connection between a client and a server, the method comprising:
   receiving access to a private cryptographic key of the server at a first network intermediary within a path of communications between the client and the server, wherein the path of communications also includes a second network intermediary;
   receiving from the client and the server handshaking messages for establishing the communication connection;
   extracting one or more fields from the handshaking messages;
   for each of the handshaking messages, forwarding the handshaking message toward the other of the client and the server from which the handshaking message was received;
   computing a session key at the first network intermediary using the one or more fields, wherein the session key is separately computed by the client and the server;
   transmitting the session key to the second network intermediary;
   at the second network intermediary:
      receiving from the client a data request encrypted with the session key;
      decrypting the encrypted request;
      optimizing the request; and
      forwarding the optimized request to the first network intermediary; and
   at the first network intermediary:
      un-optimizing the optimized request to retrieve the request;
      re-encrypting the request with the session key; and
      forwarding the re-encrypted request to the server.

2. The method of claim 1, wherein the private cryptographic key corresponds to a digital certificate of the server transmitted to the client within the handshaking messages.

3. The method of claim 1, wherein said receiving access to the private cryptographic key comprises receiving a copy of the private cryptographic key.

4. The method of claim 1, wherein said receiving access to the private cryptographic key comprises receiving access to a repository comprising the private cryptographic key.

5. The method of claim 1, further comprising:
   storing a plurality of data fields of the handshaking messages, including the one or more fields.

6. The method of claim 1, further comprising:
   verifying a digital certificate of the client.

7. The method of claim 1, further comprising:
   verifying a digital certificate of the server.

8. The method of claim 1, wherein a first handshaking message received from the client comprises a Client-Key-Exchange message, the method further comprising:
   decrypting the Client-Key-Exchange message with the private cryptographic key.

9. The method of claim 1, wherein said optimizing comprises:
   encrypting the data request with a cryptographic key shared by only the first network intermediary and the second network intermediary.

10. The method of claim 1, further comprising:
    at the first network intermediary:
       receiving from the server a response to the data request, wherein the response is encrypted with the session key;
       decrypting the encrypted response;
       optimizing the response; and
       transmitting the optimized response to the second network intermediary; and
    at the second network intermediary:
       un-optimizing the optimized response;
       re-encrypting the response with the session key; and
       transmitting the re-encrypted response to the client.

11. The method of claim 1, further comprising authenticating the client by:
    receiving from the client:
       a client digital certificate; and
       a Certificate-Verify message;
    verifying the client digital certificate; and
    validating the Certificate-Verify message.

12. The method of claim 1, wherein the second network intermediary is co-located with the client, the method further comprising:
    after said computing, transmitting a nonce from the first network intermediary to the second network intermediary;
    at the second network intermediary, encrypting the nonce with a private cryptographic key of the client;
    transmitting the encrypted nonce from the second network intermediary to the first network intermediary; and
    at the first network intermediary, attempting to decrypt the encrypted nonce with a public key extracted from a digital certificate sent by the client in the handshaking messages.

13. The method of claim 12, further comprising:
    transmitting the session key from the first network intermediary to the second network intermediary only if the encrypted nonce is successfully decrypted with the public key.

14. A non-transitory computer-readable medium storing instructions that, when executed by cooperating network intermediary computers operating in a path of communications between a client and a server, cause the network intermediary computers to perform a method of establishing a secure split-terminated communication connection between the client and the server, the method comprising:

receiving access to a private cryptographic key of the server at a first network intermediary;

receiving from the client and the server handshaking messages for establishing the communication connection;

extracting one or more fields from the handshaking messages;

for each of the handshaking messages, forwarding the handshaking message toward the other of the client and the server from which the handshaking message was received;

computing a session key at the first network intermediary using the one or more fields, wherein the session key is separately computed by the client and the server;

transmitting the session key to the second network intermediary;

at the second network intermediary:
  receiving from the client a data request encrypted with the session key;
  decrypting the encrypted request;
  optimizing the request; and
  forwarding the optimized request to the first network intermediary; and at the first network intermediary:
  un-optimizing the optimized request to retrieve the request;
  re-encrypting the request with the session key; and
  forwarding the re-encrypted request to the server.

15. Apparatus configured to facilitate establishment of a secure split-terminated communication connection between a client and a server, the apparatus comprising:

a first network device and a second network device operating in a path of communications between the client and the server, wherein at least one of the network devices has access to a private cryptographic key of the server;

first logic configured to intercept and extract one or more predetermined fields from handshaking messages exchanged by the client and the server to establish the communication connection;

second logic configured to, for each of the handshaking messages, forward the handshaking message toward the other of the client and the server from which the handshaking message was received;

third logic configured to compute a session key for the communication connection separate from the client and the server;

client-side logic configured to, at the second network device:
  receive from the client a data request encrypted with the session key;
  decrypt the encrypted request;
  optimize the request; and
  forward the optimized request to the first network device:

server-side logic configured to, at the first network device:
  un-optimize the optimized request to retrieve the request;
  re-encrypt the request with the session key; and
  forward the re-encrypted request to the server; and a secure channel coupling the first network device and the second network device.

16. The apparatus of claim 15, further comprising:
verification logic configured to verify one or more of a digital certificate of the client and a digital certificate of the server.

17. The apparatus of claim 15, further comprising verification logic configured to:
  receive from the client:
    a client digital certificate; and
    a Certificate-Verify message;
  verify the client digital certificate; and
  validate the Certificate-Verify message.

18. The apparatus of claim 15, wherein the first network device transmits the session key to the second network device via the secure channel.

19. The method of claim 15, wherein access to the private cryptographic key of the server comprises a copy of the private cryptographic key.

20. The method of claim 15, wherein access to the private cryptographic key of the server comprises access to a repository comprising the private cryptographic key.

* * * * *